Patented July 22, 1930

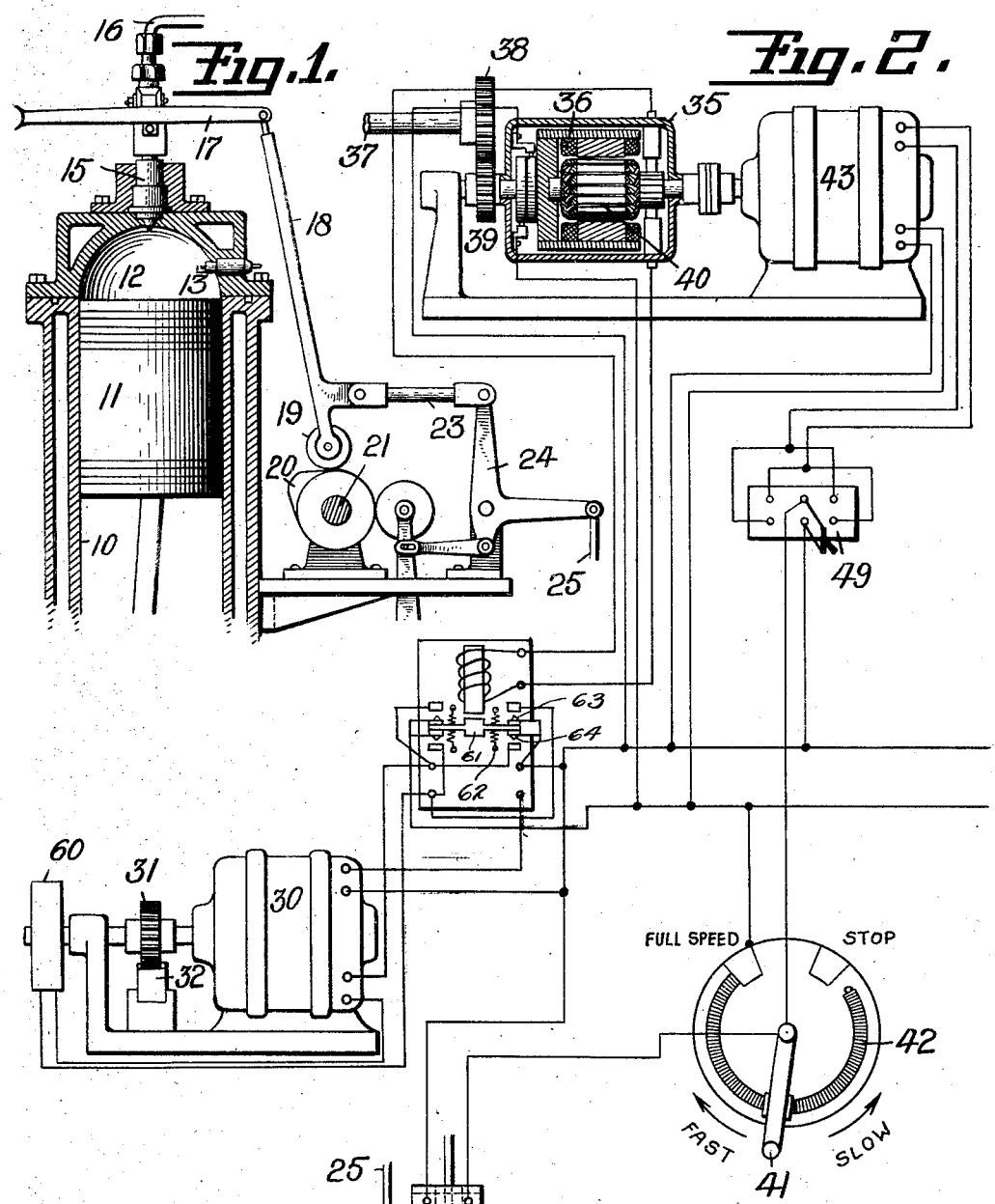

1,771,124

UNITED STATES PATENT OFFICE

GEORGE L. JONES, OF BROOKLYN, NEW YORK, ASSIGNOR TO THE SPERRY DEVELOPMENT COMPANY, OF DOVER, DELAWARE, A CORPORATION OF DELAWARE

ENGINE GOVERNOR

Application filed January 2, 1926. Serial No. 78,887.

This invention relates to engine governors and more particularly to means for controlling the speed of that type of internal combustion engine where the fuel to be injected is maintained constantly under high pressure, frequently running up to 1800 lbs. per sq. in. and even higher. The valve gearing in such a system comprising the inlet valve and the various levers and other mechanism connected thereto whereby the valve is actuated to open and closed position and whereby the degree of opening of said valve and hence the speed of the engine may be controlled must, therefore, be built substantial in order to withstand the force necessary to operate said gearing against the high pressure in the fuel supply system. Not only must the parts be of substantial construction but all connections must be fairly rigid since the adjustment of the valve is relatively fine. It will be understood that under these circumstances it requires the expenditure of considerable force to operate the valve gear and the control thereof by the ordinary type of (flyball) governor and the usual means of setting it by an operator is, therefore, not a very simple matter. One of the principal objects of my invention is to provide a hand adjustment of the governing means which will permit an easy control and fine adjustment of the said valve gear.

A further object of my invention is the provision of a governing means having the characteristics described above capable of operating at a distance from the said valve gear to permit of remote control of the engine speed.

Still another object of my invention is the provision of an electric governing means which will permit control of the engine speed when said engine is operating forward or reverse.

Other objects and advantages of this invention will become apparent in the following detailed description thereof.

In the accompanying drawings—

Fig. 1 is a vertical section through the cylinder of an internal combustion engine of the type wherein the fuel supply is constantly under high pressure, and showing a form of valve gearing applied thereto.

Fig. 2 is an assembly view, partly sectioned and largely diagrammatic, of a preferred form of electric governor embodying my invention.

Fig. 3 is a part of the valve gear actuating mechanism adapted to be operated by the mechanism of Fig. 2.

Referring to the drawings, Fig. 1 shows a cylinder 10 of a type of internal combustion engine, in which operates a piston 11 adapted to compress the combustible mixture in a combustion chamber 12 where it is ignited by igniter 13. The combustible mixture includes fuel which is injected through a valve 15 under high pressure, the fuel being constantly maintained under great pressure within the supply system 16. For operating the valve 15 there is shown a conventional form of valve gear which may include a lever 17 and a link 18 having engagement at its lower end, shown here in the form of a roller 19, with a cam 20 on the cam shaft 21 operated from the engine. By this means it will be observed that periodically the link 18 is actuated to open the valve.

The degree of valve opening may be varied by controlling the position of roller 19 with respect to cam 20. This may be done by some means such as a link 23 connected to link 18 and adapted to be operated by a bell crank 24, connected by some means, such as a link 25, to a suitable governing means. In this manner the governor may actuate roller 19 to the right or left to vary the length of time that cam 20 engages said roller and hence the length of time during which the valve 15 is opened and fuel injected. In this manner the quantity of fuel injected and hence the speed of the engine may be controlled.

While heretofore the control means of an engine consisted of a governor having relatively little operative force, I have shown a form of governor comprising means capable of exerting a force great enough to operate the valve gear of an engine having a fuel supply constantly under pressure, but which is nevertheless capable of fine and easy adjustment by hand. For this purpose I may employ a servo-motor 30 for operating link 25 through some connection, such as pinion 31, engaging rack 32 to rock a bell crank 33 connected at its other end to link 25. The hand adjustment of the governor may be effected as follows:

I employ a dynamo 35 having a field 36 controlled by the engine speed through some connection, such as shaft 37 and gearing 38—39 while the armature 40 of said motor is controlled by the hand lever 41 operating through a rheostat 42 and a motor 43 connected to the armature 40, so that the speed of armature 40 is controlled by handle 41 which may be actuated by an operator, at a remote point if desired. The speed of armature 40, therefore, represents the desired speed while the speed of field 36 represents the actual engine speed. When the speeds of the said field 36 and armature 40 are the same, the actual speed is the desired speed and switch 50 controlling the motor 30 is open and motor 30 is not operating to affect the valve gearing. The switch 50 may be of an ordinary type adapted to be actuated by the flow of current therethrough to close the circuit through the motor 30. Said switch 50 may comprise an electro-magnet 60 adapted to attract or repel an armature 61 normally centralized by means such as springs 62, according as the current passes therethrough in one direction or the other to close an upper set of contacts 63 or a lower set 64 to energize the motor 30 in one direction or the other. When it is desired to change the speed of the engine, handle 41 is operated to cause armature 40 to increase or decrease its speed as desired, so that the speed of said armature is different from the speed of the field 36, which condition will cause a flow of current through switch 50 to close the circuit through motor 30 in one direction or the other to cause said motor to actuate the valve gearing in the proper direction to increase or decrease the length of time of opening of valve 15, and thus increase or decrease the speed of the engine as desired. When the proper engine speed is obtained, the speed of field 36 will again be the same as the speed of armature 40 and no current will be generated through switch 50 so that the circuit through motor 30 will be broken.

The governing means described above is effective for reverse running of the engine as well as for forward running thereof, for when field 36 is reversed in direction, due to reverse running of the engine, the armature 40 may also be reversed by means such as a switch 49.

Brake means 60 may be employed in connection with the motor 30 to bring the latter quickly to a stop. Preferably the brake is of the electromagnet type in circuit with motor 30 so that when the circuit through the motor is closed, the brake is rendered ineffective, but becomes effective as soon as the circuit through said motor is broken.

Should the electric governing system fail for any reason, I may provide a solenoid 52 adapted to drop its core 53 whenever the electric governing circuit fails and thus open the inlet valves of the fuel pump to stop the engine.

In accordance with the provisions of the patent statuates, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A governing mechanism for the valve operating gear of an internal combustion engine having a fuel supply constantly under pressure, said mechanism including an electrically operated governing means therefor, including a dynamo having a rotatable field member and a rotatable armature member, means including a hand-operated rheostat and a motor controlled thereby for controlling the speed of one of said members, means whereby the engine controls the speed of the other of said members, and means for governing said gear, said last named means including a switch controlled by the differential speeds of said members and a servo-motor connected to said gear and controlled by said switch.

2. A governing mechanism for the valve gear of an internal combustion engine having a fuel supply constantly under pressure and a fuel pump for maintaining said pressure, said mechanism including an electric circuit and means for rendering said pump ineffective when said circuit fails.

3. A governing mechanism for the valve gear of an internal combustion engine having a fuel supply constantly under pressure and a fuel pump for maintaining said pressure, said mechanism including an electrically operated means for said gear, and means for rendering said pump ineffective when the electric circuit of said electrically operated means fails.

In testimony whereof I have affixed my signature.

GEORGE L. JONES.